US007245389B2

(12) United States Patent
Dougherty et al.

(10) Patent No.: US 7,245,389 B2
(45) Date of Patent: Jul. 17, 2007

(54) BURST MODE FOR PRINTING DEVICES

(75) Inventors: Patrick Dougherty, Boise, ID (US); Santiago Rodriguez, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 831 days.

(21) Appl. No.: 10/349,566

(22) Filed: Jan. 23, 2003

(65) Prior Publication Data

US 2004/0145763 A1 Jul. 29, 2004

(51) Int. Cl.
*G06F 15/00* (2006.01)
*B41J 2/385* (2006.01)

(52) U.S. Cl. ...................................... 358/1.13; 347/156

(58) Field of Classification Search ............... 358/1.13, 358/1.14; 219/216, 469; 399/329, 334; 392/417; 347/133, 156
See application file for complete search history.

(56) References Cited

U.S. PATENT DOCUMENTS 5,107,276 A * 4/1992 Kneezel et al. ............... 347/60
6,018,140 A 1/2000 Hirose et al.
6,375,298 B2 * 4/2002 Purcell et al. ................ 347/14
6,975,417 B1 * 12/2005 Hilpl et al. ................ 358/1.15

FOREIGN PATENT DOCUMENTS

DE 19549158 12/1995

* cited by examiner

*Primary Examiner*—King Y. Poon
*Assistant Examiner*—Saeid Ebrahimi

(57) ABSTRACT

Systems and methods are described herein for enabling a burst mode in a printing device to accelerate a first page out time for a print job. A warm up period typically allowed in a laser printer is used to heat up a fuser to an optimum temperature. When certain printing conditions exist, burst mode enables the printer to omit the warm up period and operate with the fuser at a lower temperature. The lower temperature is acceptable for most printing conditions without degrading print quality. If the print conditions indicate the warm up period is desirable, then burst mode is not enabled. Print conditions include temperature, humidity, print job length, print job coverage, print job media size, simplex/duplex mode, and the like.

29 Claims, 3 Drawing Sheets

100

BURST MODE FOR PRINTING DEVICES

TECHNICAL FIELD

The systems and methods described herein generally relate to printing devices print speed. More particularly, the systems and methods described herein relate to providing an accelerated first page out during printing.

BACKGROUND

Anyone who has ever used a laser printer is familiar with the lag between the time a print job is submitted to the laser printer and the time the first page of the print job is printed from the laser printer. Although the delay can sometimes be frustrating, it has become so common that laser printer users have grown to accept the delay as an inevitable inconvenience.

One reason for the delay is that the laser printer requires some time to increase current to a fuser in the laser printer to heat the fuser. If the fuser is not heated to a high enough temperature in certain temperature or humidity conditions, or for certain printer usage, then toner may not properly adhere to print media. Heating the fuser to an appropriately high temperature ensures that the toner will be properly affixed to print media, no matter the printer usage or environmental conditions.

However, most printers are used in conditions—such as in offices—that don't require the fuser to be heated to as high of a temperature as might be required in some extreme conditions. Printers must be designed, however, with margins to operate properly in even the extreme conditions. Hence, the fuser warm up time is required and causes the first page out delay.

SUMMARY

Systems and methods are described herein for a burst mode wherein a first page out time for a printer is decreased. Conditions are monitored and if the conditions fall within a particular range, then the fuser does not have to be heated to as high of a temperature as when the conditions fall outside the range. Thus, an initial warm up time is not required and the printer can increase the rate at which print media is processed. This results in a shorter time to first page out.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
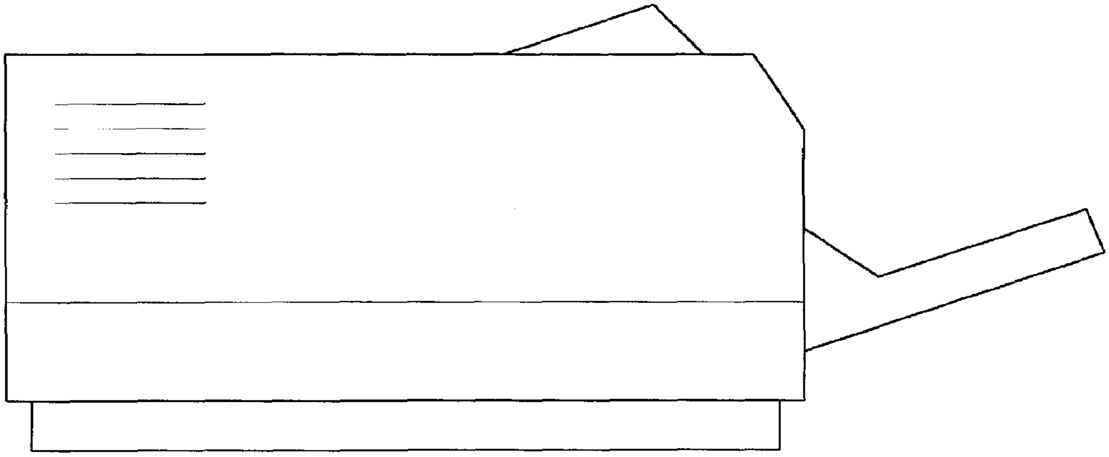
FIG. 1 is an illustration of an exemplary laser printer.

The following description sets forth one or more specific implementations and/or embodiments of burst mode printing systems and methods. The systems and methods incorporate elements recited in the appended claims. These implementations are described with specificity in order to meet statutory written description, enablement, and best-mode requirements. However, the description itself is not intended to limit the scope of this patent.

Also described herein are one or more exemplary implementations of burst mode printing systems and methods. Applicant intends these exemplary implementations to be examples only. Applicant does not intend these exemplary implementations to limit the scope of the appended claims. Rather, Applicant has contemplated that the claimed systems and methods might also be embodied and implemented in other ways, in conjunction with other present or future technologies.

Computer-Executable Instructions

An implementation of a burst mode printing system and/or method may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer-Readable Media

An implementation of a burst mode printing system and/or method may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile/video disks (DVD) or other optical storage, magnetic cassettes, magnetic tape, magnetic disk storage or other magnetic storage devices, or any other medium which can be used to store the desired information and which can be accessed by a computer.

"Communications media" typically embodies computer-readable instructions, data structures, program modules, or other data in a modulated data signal, such as carrier wave or other transport mechanism. Communication media also includes any information delivery media.

Methods, printing systems, printing devices and computer-readable media, according to various implementations, relate to increased printer first page out speed. A printing device, as used herein, means any device that applies a printing material to one or more types of print media, such as a laser printer, an inkjet printer, a dry material printer, a copier, a facsimile machine, a plotter, and the like.

The systems and methods described herein provide for a burst mode in a laser printer wherein a first page out time for the printer is decreased. Printer conditions are monitored and if the conditions fall within a particular range, then the fuser does not have to be heated to as high of a temperature as when the conditions fall outside the range. As a result, an initial warm up time is not required and the printer can increase the rate at which print media is processed. This results in a shorter time to first page out.

The printer conditions may include environmental conditions, such as temperature and humidity, historical printer usage data, print job parameters, and the like. If the printer is operating in a high temperature and high humidity environment, burst mode is not used because the fuser must be heated to a temperature sufficient to remove significant moisture from the print media. Additionally, if the temperature is too cold, then the warm up time is also required and burst mode is not used. Burst mode may be used in a low to normal temperature and high humidity environment because the media cannot absorb too much moisture at the lower temperatures.

Historical printer usage data may be used to estimate what type of print job can be expected and this can have an affect on the decision to utilize burst mode or not. The usage data may also be determined from a submitted print job. For example, if a print job is a single page, then the job can be printed because the fuser will contain enough thermal mass to print the page even without being heated to a higher temperature. Similarly, if the media size is smaller than a full page, then burst mode may be possible even in a high temperature and high humidity environment. Burst mode may also be used in instances where a print job prints in duplex mode, since the media makes two passes and moisture can be removed with a lower fuser temperature.

The temperature and humidity may be measured directly with sensors in the printing device or may be inferred from other conditions. For example, if a printer shows a history of higher fuser temperatures (i.e. currents) then a high temperature and high humidity environment may be inferred. Likewise, a transfer roller may have a history of voltage and current readings that indicate a high temperature and high humidity environment—and, therefore, no burst mode—or that indicate other than such an environment, i.e., burst mode is available.

Exemplary Printing Device and Replaceable Component

FIG. 1 is a diagrammatic illustration of a laser printer 100 in accordance with the systems and methods described herein. The laser printer 100 is but one of many printing devices in which the described systems and methods may be implemented. The implementations described herein—while described in the context of a laser printer—are not limited to a laser printer, but may be used in any number of different types of printing devices. In particular, the concepts described herein may be implemented in an ink-jet printer, a dry material printer, a copier, a facsimile machine, a plotter, and the like.

Figure 2:
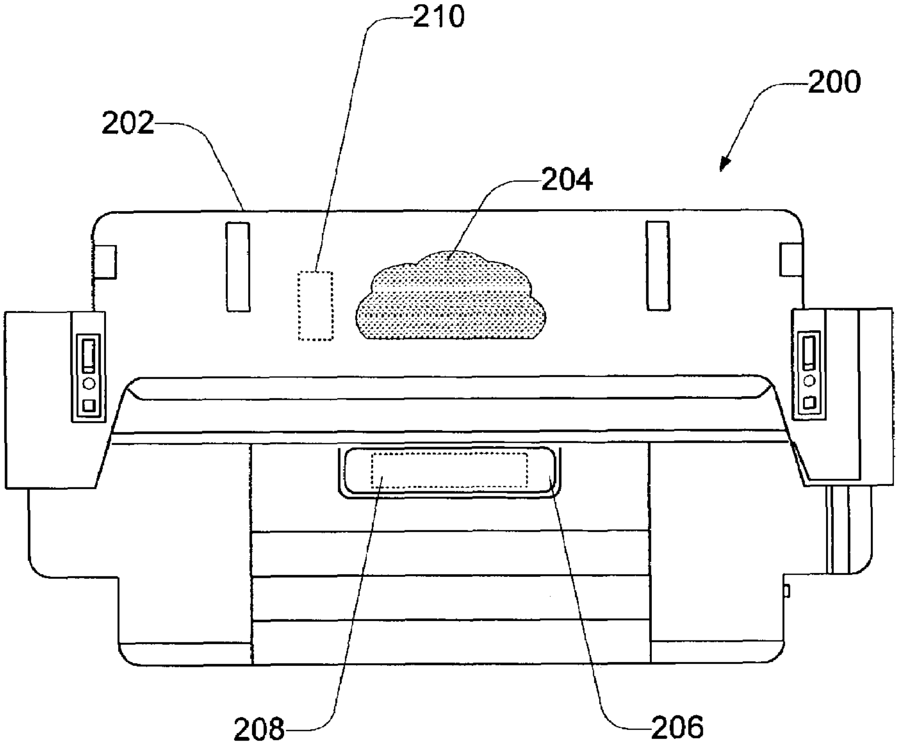
FIG. 2 is a diagrammatic illustration of an exemplary toner cartridge with memory for use in a laser printer.

FIG. 2 is a diagrammatic illustration of a laser printer toner cartridge 200 in accordance with the systems and methods described herein. The laser printer toner cartridge 200 is a replaceable component in the laser printer 100 shown in FIG. 1, i.e., the toner cartridge 200 is installable into and removable from the laser printer 100. Although the examples provided herein relate to laser printers and toner cartridges, it is noted that the systems and methods described herein may be implemented with virtually any number of printing device replaceable components. In particular, other printing device replaceable components include but are not limited to ink cartridges, dry material cartridges, drums, fusers, pens, transfer belts, rollers, and the like.

The toner cartridge 200 includes a housing 202, a toner reservoir/supply 204, and a label 206 that contains information identifying the toner cartridge 200. The label 206 typically recites the name of the manufacturer, the model number of the cartridge, etc. A memory tag 208 is located underneath the label 206 on the toner cartridge 200, although the memory tag 208 may be placed on or in the toner cartridge 200 at any location which may be practical for the purposes described herein. The memory tag 208, which can be conventional semiconductor memory, can communicate with laser printer 100 (FIG. 1) by a direct electrical connection thereto, and would be, as such, a direct connection memory tag. Alternatively, the memory tag 208 can be a radio frequency identification (RFID) memory tag. RFID memory tags, sensor communications, and applications therefor are well known in the art.

The memory tag 208 is used to store various data about the toner cartridge 200. Usage data indicating how the laser printer 100 is used while the toner cartridge 200 may be stored in the memory tag 208. For example, average print job length, average page coverage (i.e., the amount of print media covered with printing material relative to the size of the entire print media), simplex/duplex printing, pages printed using the toner cartridge, and the like may be stored in the memory tag 208. Other information useful to the implementations described herein may also be stored in the memory tag 208. The information stored in the memory tag 208 in the present examples will be described in greater detail below.

One or more sensors 210 can be in and/or on the toner cartridge 200 (or other replaceable component) and can be used to sense/measure quantities/amounts of a component consumable that is available in the replaceable component. The sensor 210 shown is a toner sensor 210 that measures available toner by volume or by weight.

Exemplary Printing System

Figure 3:
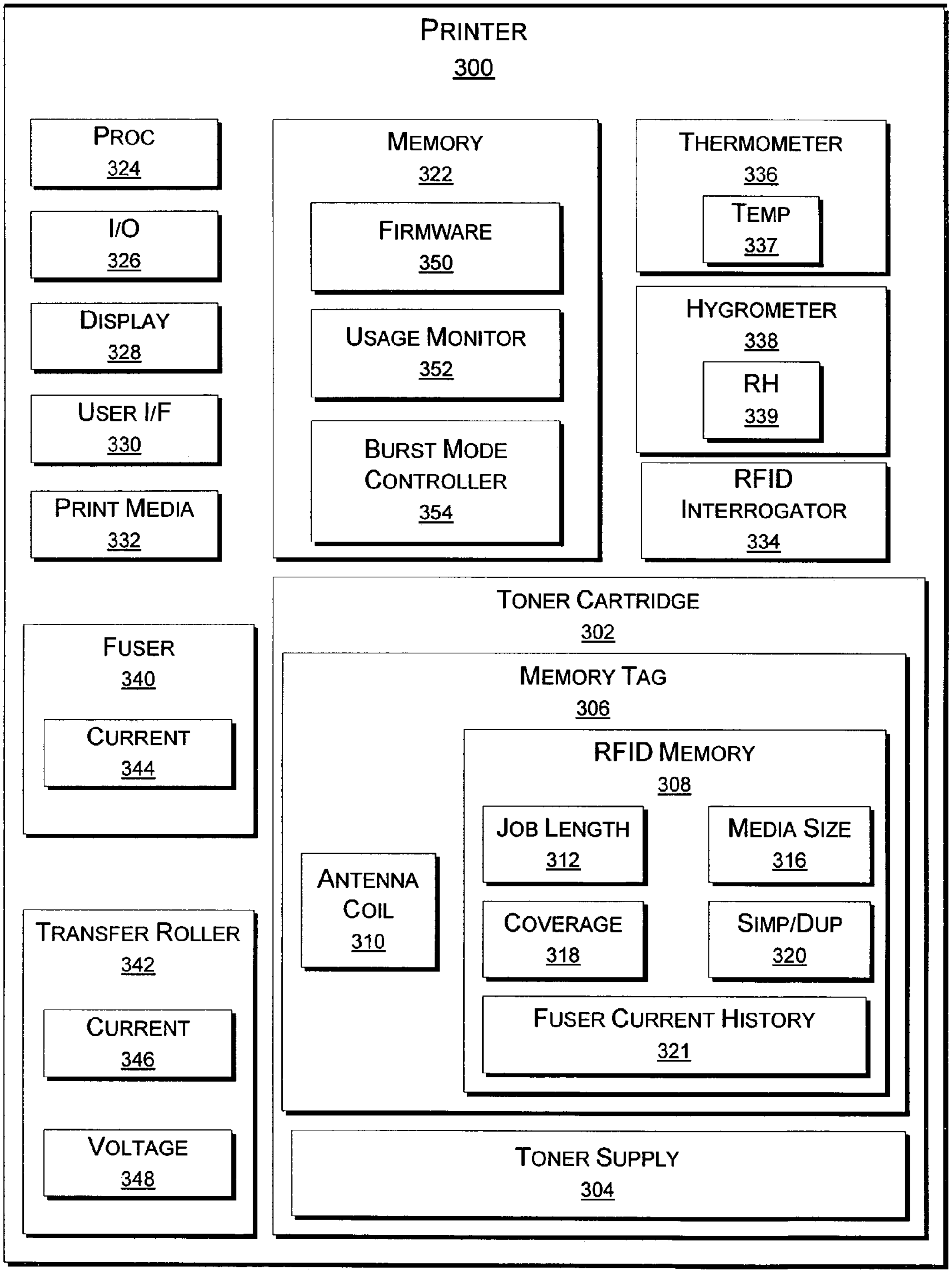
FIG. 3 is a block diagram of an example laser printer 300 in accordance with at least one implementation described herein.

FIG. 3 is a block diagram of an exemplary laser printer 300 in accordance with at least one implementation described herein. Although the printer 300 is shown as a laser printer, the concepts described herein are not necessarily limited to a laser printer. One or more of the described concepts may be implemented using an inkjet printer, a dry material printer, a copier, a fax machine, a plotter, or the like.

The printer 300 includes a toner cartridge 302 having a toner supply 304. The toner cartridge 302 includes a memory tag 306 that stores information related to the toner cartridge 302 and/or the printing device 300. The memory tag 306 includes radio frequency identification (RFID) memory 308 and an antenna coil 310 that is used to receive power and data transmissions from the printing device 300. Although the toner cartridge 302 is shown having RFID memory, it is noted that the systems and methods described herein may be implemented with other types of toner cartridge memory (such as semiconductor memory) or with no toner cartridge memory at all.

The RFID memory 308 is shown as storing several printer usage parameters, namely, job length 312, media size 314, page coverage 318, simplex/duplex mode 320 and fuser current history 321. These parameters 312-320 may include an average for prior print jobs printed using the toner cartridge 302, or they may be these particular parameters for each previous print job printed using the toner cartridge. In the present example, each of these parameters 312-320 is an average value from all previous print jobs processed using the toner cartridge 302.

The printer 300 may also include memory 322, a processor 324, an input/output (I/O) port 326 to support communication between the printer 300 and a host device or network (not shown), and a display 328. The display 328 is used to display user messages regarding the printer 300. In some implementations, the display 328 may be a touch sensitive display.

The printer 300 may further include a user interface 330 through which a user may communication with the printer 300. The user interface 330 may be a keypad or a software driven module that works, for instance, in conjunction with a touch sensitive display. The printer 300 also contains print media 332 such a paper or transparencies on which the printer 300 prints.

To communicate with the RFID memory 308 of the toner cartridge 302, the printer 300 may include an RFID interrogator 334. The RFID interrogator is configured to provide power to the memory tag 306 and to read from and write to the RFID memory 308. RFID memory and uses therefor are well known in the art.

The printer 300 may also include a temperature sensor (thermometer) 336, a humidity sensor (hygrometer) 338, a fuser 340 and a transfer roller 342. The fuser 340 shows a current reading 344 and the transfer roller 342 exhibits a voltage reading 346 and a current reading 348.

The printer memory 322 stores printer firmware 350 that controls operation of the printer 300, a usage monitor 352 configured to monitor printer 300 usage and store printer usage data in the toner cartridge RFID memory 308, and a burst mode controller 354 that is configured to carry out the processes shown and described herein.

The features and elements shown and described in FIG. 3 will be discussed in greater detail below, with respect to FIG. 4, in reference to a methodological implementation utilizing the printer 300 shown in FIG. 3.

Methodological Implementation: Printer Burst Mode

Figure 4:
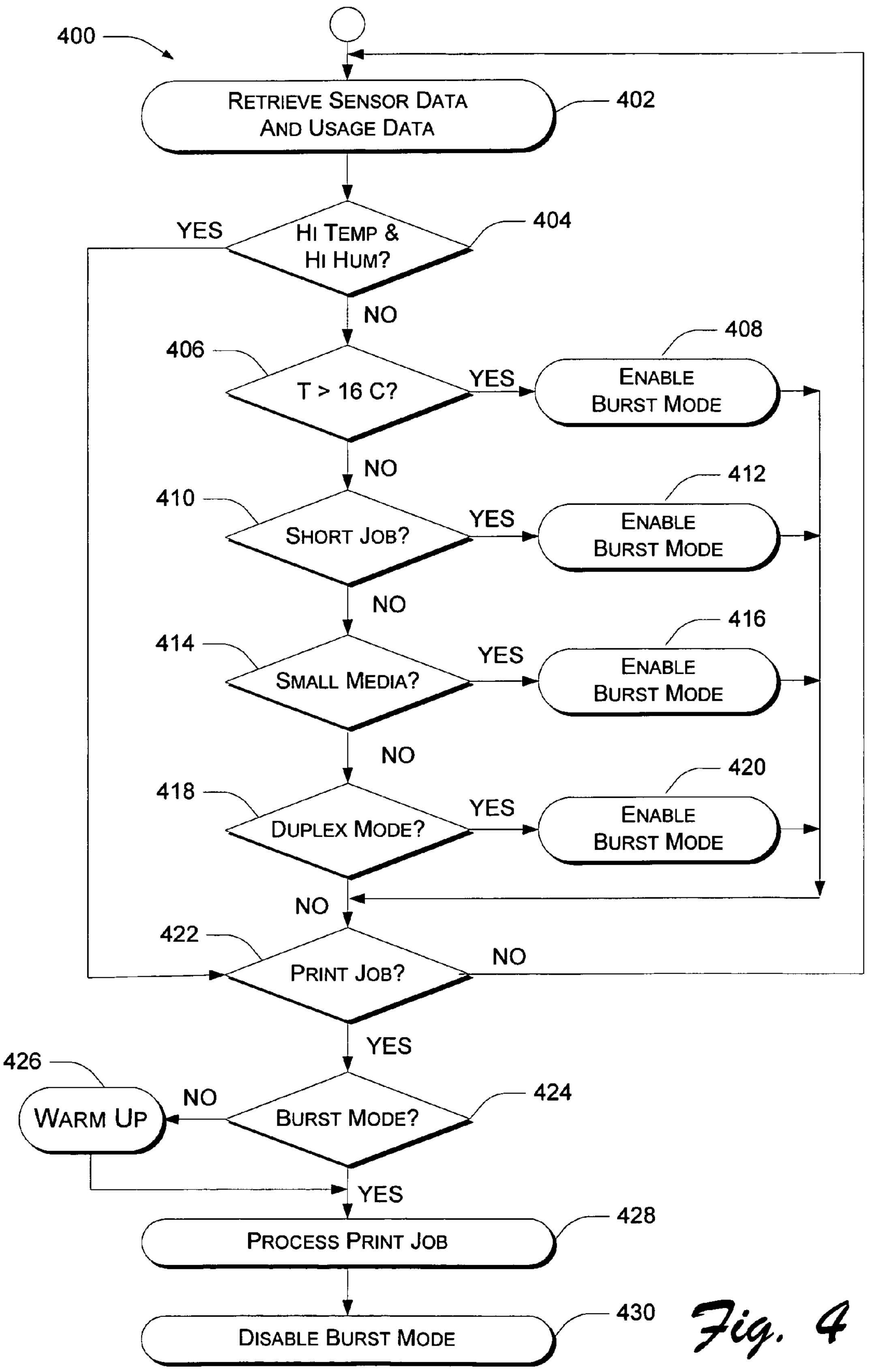
FIG. 4 is a flow diagram depicting a methodological implementation of a burst mode printing system.

FIG. 4 is a flow diagram depicting but one implementation of a methodological implementation 400 of a printer burst mode. In the following discussion, continuing reference will be made to the elements and reference numerals shown in FIG. 3.

At block 402, the burst mode controller 354 retrieves sensor data from the temperature sensor 336 and the humidity sensor 338, and usage data 312-320 from the toner cartridge 302. This may be done at any predetermined time interval or in response to an action, such as the submission of a print job, the completion of a print job, etc.

The burst mode controller 354 proceeds to check a number of conditions from block 404 to block 418 to determine if burst mode can be enabled on the printer 300. At block 404, the burst mode controller 354 determines if a high temperature and high humidity condition exists. For example, if the temperature is over twenty-eight degrees (28°) Celsius and the humidity is over seventy percent (70%) then a high temperature and high humidity condition exists. Burst mode is not desirable in a high temperature and high humidity situation. If a high temperature and high humidity condition exists ("Yes" branch, block 404), then the process continues at block 422 where, if a print job is ready, print processing continues. Otherwise, the process repeats until a print job is received.

It is noted that the particular ranges of temperature and humidity may vary depending on the particular printer in which the process is utilized. For higher range printers, the temperature and humidity ranges may be higher due to a better quality of component being present in the printer. Other factors may also affect the temperature and humidity ranges that are used in this process.

It is also noted that a direct reading of temperature and humidity is not required. In some instances, the detection of a high temperature and high humidity condition—or an ideal condition—may be inferred from other factors.

For example, the fuser current history 321 may indicate that the fuser has operated at a high temperature for a certain number—or all—of the previous print jobs printed using the toner cartridge 302. This may indicate that the printer 300 is operating in an unusual environment in which burst mode may not be desirable.

Additionally, a transfer roller 342 may have a voltage reading 348 that is relatively high and a current reading 346 that is relatively low. This indicates that the printer 300 is operating in a low temperature and low humidity (i.e. ideal) environment in which burst mode may be desirable.

If a high temperature and high humidity condition does not exist ("No" branch, block 404), then the burst mode controller 354 determines if the temperature is greater than, for example, sixteen degrees (16°) Celsius at block 406. If the temperature is greater than 16° ("Yes" branch, block 406), then burst mode is enabled at block 408. If, however, the temperature is 16° or less ("No" branch, block 406), then the cold temperature necessitates the fuser to be heated to a high temperature to ensure proper toner adherence to the print media 332. Therefore, burst mode cannot be used and it is not enabled at this point.

There are some instances where burst mode may be used even though the temperature and humidity are not ideal. In these instances, factors other than temperature or humidity make it possible for the printer 300 to print properly even though the fuser 340 contains a lower thermal mass.

At block 410, the burst mode controller 354 determines if a submitted print job or a print job history (i.e. job length 312) indicates that the print job will only be a short print job, such as one page. If so ("Yes" branch, block 410), then burst mode is enabled at block 412 because the fuser can attain sufficient thermal mass to print a single page without requiring additional time to warm up. If the print job is not a short print job ("No" branch, block 410), then burst mode is not enabled at this point.

If the print job utilizes a small media size—in actuality or if the media size 316 history indicates so—("Yes" branch, block 414) then burst mode is enabled at block 416 because the fuser will have sufficient thermal mass to properly print on a small medium, such as an index card. If small media are not used ("No" branch, block 414) then burst mode is not enabled at this time.

If the printer is printing in duplex mode, where the printer 300 prints on both sides of the media ("Yes" branch, block 418) then burst mode is enabled at block 320. This is acceptable because the media makes two passes by the fuser and, therefore, the fuser does not require as much thermal mass to remove moisture, heat the media, etc. If the printer 300 is in simplex mode ("No" branch, block 418) then burst mode is not enabled.

The previous steps can be performed at periodic intervals not related to print job submission, processing or completion. If so, then when a print job is submitted ("Yes" branch, block 422), the burst mode controller 354 determines if burst mode is enabled (block 424). If so ("Yes" branch, block 424), then the print job is immediately processed at block 428. If not ("No" branch, block 424), then the printer 300 warms up at block 426 before processing the print job at block 428.

Other considerations—though not specifically shown in FIG. 4—may be used to determine when burst mode should be enabled. For example, if page coverage is used as a criterion, then burst mode may be enabled, for example, if page coverage is anticipated to be twenty-five percent (25%) or less. This parameter may be used because a page with little coverage can be printed with less fuser thermal mass than a page with a large amount of print coverage.

As previously mentioned, the difference between the printer warming up and the printer processing a print job immediately (i.e., regular mode vs. burst mode) may be that the print media 332 is transferred at a faster rate which passes the media 332 to the fuser 344 faster which, in turn, provides the first page out more quickly. In a regular mode, the fuser may warm up to an adequate temperature in the time that a piece of print medium passes from a paper tray to the fuser. Specific implementation, however, will depend on characteristics of the printer in which the process is implemented.

At block 430, the burst mode controller 354 disables burst mode on the printer 300. Burst mode may be set again in a subsequent iteration of the process from blocks 402 to block 428. Also, as previously noted, the flow diagram shown in FIG. 4 is exemplary of but one implementation of a burst mode process. Those skilled in the art will recognize that the logic to perform the enabling and disabling of the burst control mode may differ.

Conclusion

Implementation of the systems and methods described herein provide a way for a printer to provide a first page out more quickly when the printer is operating in a typical environment. Depending on the printer environment, on printer usage history or print job characteristics, the printer may enable burst mode to accelerate the first page out, or may operate in non-burst mode wherein the printer first page out behavior is typical.

Although the systems and methods have been described in language specific to structural features and/or methodological steps, it is to be understood that the systems, methods and articles of manufacture defined in the appended claims are not necessarily limited to the specific features or steps described. Rather, the specific features and steps are disclosed as particular forms of implementing the claimed systems, methods and articles of manufacture.

What is claimed is:

1. A method for use in a printing device, comprising:

determining stored environmental or job description parameters;

determining whether to enable burst mode printing in the printing device, wherein burst mode printing is a printing mode which accelerates printing of a first page by omitting a warm up period required for non-burst mode printing, and wherein the burst mode allows printing when a fuser thermal mass is less than is required for non-burst mode printing; and enabling burst mode if the stored environmental or job description parameters are within acceptable values.

2. The method as recited in claim 1, wherein:

the stored environmental or job description parameters further comprise temperature and humidity of a printing device environment; and burst mode is not enabled in a high temperature and high humidity environment.

3. The method as recited in claim 1, wherein the stored environmental or job description parameters further comprise one or more print job parameters selected from a group consisting of: print job coverage, print job length, simplex/duplex mode, and print media size.

4. The method as recited in claim 3, wherein the print job parameters are taken from a print job submitted to the printing device.

5. The method as recited in claim 3, wherein the print job parameters are inferred from print job parameter averages from prior print jobs printed from the printing device.

6. The method as recited in claim 1, wherein:

the stored environmental or job description parameters further comprise print job length; and the acceptable values for print job length further comprises one page or less.

7. The method as recited in claim 1, wherein:

the stored environmental or job description parameters further comprise print job coverage; and the acceptable values for print job coverage further comprises coverage of twenty-five percent (25%) or less of a print media page.

8. The method as recited in claim 1, wherein:

the stored environmental or job description parameters further comprise simplex/duplex mode; and the acceptable values for simplex/duplex mode further comprises duplex mode.

9. The method as recited in claim 1, wherein:

the stored environmental or job description parameters further comprise print job print media size; and the acceptable values for print job print media size further comprises a media sheet less than or equal to four and one-quarter inches by five and one-half inches (4¼"×5½").

10. The method as recited in claim 1, further comprising:

receiving a print job;

processing the print job in burst mode if burst mode is enabled; and processing the print job in non-burst mode if burst mode is not enabled.

11. The method as recited in claim 1, wherein the printing device further comprises a laser printer that includes a fuser; and the method further comprises:

heating the fuser to a first temperature if the warm up period is provided;

heating the fuser to a second temperature if the warm up period is omitted; and wherein the first temperature is higher than the second temperature.

12. The method as recited in claim 1, wherein the printing device further comprises a laser printer that includes a fuser; and the method further comprises:

providing a first current level to the fuser if the warm up period is provided;

providing a second current level to the fuser if the warm up period is omitted; and wherein the first current level is greater than the second current level.

13. A laser printer, comprising:

a toner cartridge containing toner;

a fuser;

a usage monitor configured to determine certain printer usage parameters; and a burst mode controller configured to determine if the monitored printer usage parameters are within acceptable ranges, and enable burst mode to bypass a warm up period before printing a print job if the monitored usage parameters are within acceptable ranges, wherein the burst mode allows printing when a fuser thermal mass is less than is required for non-burst mode printing.

14. The laser printer as recited in claim 13, further comprising a temperature sensor and a relative humidity sensor, and wherein:

the monitored printer conditions further comprise temperature and humidity; and the acceptable ranges further comprises a temperature between sixteen (16) degrees Celsius and twenty-eight (28) degrees Celsius, and a humidity of less than seventy percent (70%).

15. The laser printer as recited in claim 13, wherein the certain usage parameters further comprise print job length, print job coverage, print media size and simplex/duplex mode.

16. The laser printer as recited in claim 13, wherein:

the certain usage parameters further comprises print job length; and the acceptable range further comprises a print job length of one page or less.

17. The laser printer as recited in claim 13, wherein:

the certain usage parameters further comprises print job coverage; and the acceptable range further comprises a print job coverage of twenty-five percent (25%) or less.

18. The laser printer as recited in claim 13, wherein:

the certain usage parameters further comprises print job media size; and the acceptable range further comprises a print job media size of one-half a letter sized sheet or less.

19. The laser printer as recited in claim 13, wherein:

the certain usage parameters further comprises simplex/duplex mode; and the acceptable range further comprises duplex mode.

20. The laser printer as recited in claim 13, wherein the certain usage parameters are determined from values stored in memory.

21. The laser printer as recited in claim 13, further comprising:

toner cartridge memory integrated with the toner cartridge; and wherein the certain usage parameters are determined from values stored in the toner cartridge memory.

22. One or more computer-readable media containing computer-executable instructions that, when executed on a computer, perform the following steps;

evaluating one or more print conditions within which a printing device operates to determine if the one or more print conditions fall within an acceptable range of print condition values;

enabling a printing device burst mode if the evaluating print conditions fall within the acceptable range of print condition values; and wherein the burst mode allows printing when a fuser thermal mass is less than is required for non-burst mode printing.

23. The one or more computer-executable instructions as recited in claim 22, wherein the one or more print conditions are one or more print conditions selecting from a group consisting of: temperature, humidity, print job length, print job coverage, print job media size and simplex/duplex mode.

24. The one or more computer-executable instructions as recited in claim 22, wherein:

the one or more print conditions further comprise temperature and humidity; and the acceptable ranges further comprise a temperature range of sixteen (16) degrees Celsius to twenty-eight (28) degrees Celsius, and a humidity range of less than seventy percent (70%).

25. The one or more computer-executable instructions as recited in claim 22, wherein:

the one or more print conditions further comprises print job length; and the acceptable ranges further comprises a print job length of one page or less.

26. The one or more computer-executable instructions as recited in claim 22, wherein:

the one or more print conditions further comprises print job coverage; and the acceptable ranges further comprises a print job coverage of twenty-five percent (25%) or less.

27. The one or more computer-executable instructions as recited in claim 22, wherein:

the one or more print conditions further comprises print job media size; and the acceptable ranges further comprises a print job media size of twenty-four (24) square inches or less.

28. The one or more computer-executable instructions as recited in claim 22, wherein:

the one or more print conditions further comprises simplex/duplex mode; and the acceptable ranges further comprises duplex mode.

29. A laser printer toner cartridge with memory that stores one or more printer parameters selected from the following group:

temperature of printer environment;

relative humidity of printer environment;

print job length;

print job coverage;

print media size; and simplex/duplex mode;

wherein the print parameters are configured to define a burst mode that allows printing when a fuser thermal mass within a printer in which the cartridge is installed is less than is required for non-burst mode printing.

* * * * *

UNITED STATES PATENT AND TRADEMARK OFFICE

CERTIFICATE OF CORRECTION

PATENT NO. : 7,245,389 B2
APPLICATION NO. : 10/349566
DATED : July 17, 2007
INVENTOR(S) : Patrick Dougherty et al.

It is certified that error appears in the above-identified patent and that said Letters Patent is hereby corrected as shown below:

In column 1, line 56, delete “example” and insert -- exemplary --, therefor.

In column 9, line 39, in Claim 22, after “steps” delete “;” and insert -- : --, therefor.

Signed and Sealed this

Ninth Day of September, 2008

JON W. DUDAS
*Director of the United States Patent and Trademark Office*